United States Patent [19]

Treber

[11] 4,437,727
[45] Mar. 20, 1984

[54] QUARTZ GLASS ENVELOPE TUBE

[75] Inventor: Norbert Treber, Kriftel, Fed. Rep. of Germany

[73] Assignee: Heraeus Quarzschmelze GmbH, Hanau, Fed. Rep. of Germany

[21] Appl. No.: 384,467

[22] Filed: Jun. 3, 1982

[30] Foreign Application Priority Data

Jul. 21, 1981 [DE] Fed. Rep. of Germany ....... 3128698

[51] Int. Cl.³ .................. G02B 5/14; C03C 25/02; F16L 9/14
[52] U.S. Cl. .................... 350/96.3; 138/141; 428/36
[58] Field of Search .......... 138/141, DIG. 2; 428/36; 350/96.34, 96.30, 96.29

[56] References Cited

U.S. PATENT DOCUMENTS

| 3,698,653 | 10/1972 | Okamura | 242/55.3 |
| 3,772,134 | 11/1973 | Rau | 428/36 |
| 3,776,809 | 12/1973 | Bäumler et al. | 428/36 |
| 3,869,194 | 3/1975 | Shiraishi et al. | 350/96.34 |
| 3,882,901 | 5/1975 | Serter et al. | 138/141 |
| 3,925,583 | 12/1975 | Rau et al. | 428/36 |
| 3,966,300 | 6/1976 | Bernsee | 350/96.34 |
| 4,165,915 | 8/1979 | Rau et al. | 350/96.34 |
| 4,215,665 | 8/1980 | Stambaugh | 123/198 |

Primary Examiner—William R. Dixon, Jr.
Attorney, Agent, or Firm—Sprung, Horn, Kramer & Woods

[57] ABSTRACT

A quartz glass envelope tube for the preparation of a light guide fiber blank, the tube being in the form of a laminate in which the inner layer consists essentially of quartz glass made from rock crystal and the outer layer of synthetic quartz glass. Good mechanical properties, especially tensile strength, are thereby achieved.

13 Claims, 1 Drawing Figure

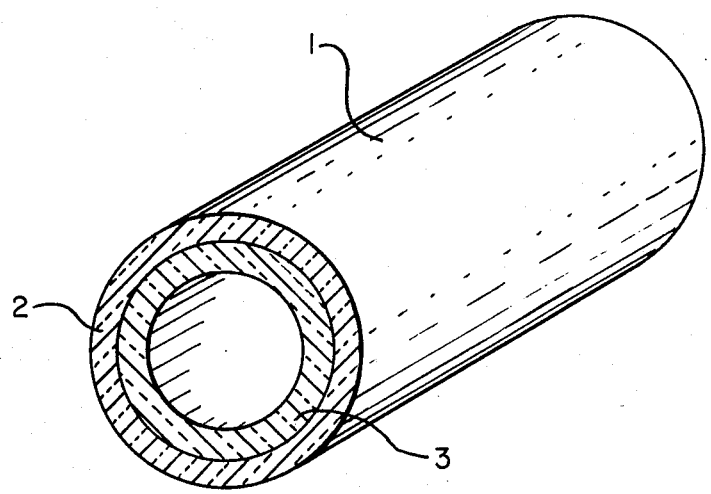

QUARTZ GLASS ENVELOPE TUBE

BACKGROUND OF THE INVENTION

1. Field of the Invention

The invention relates to a vitreous silica envelope tube for the preparation of a light guide fiber billet.

2. Discussion of Prior Art

Light guide fibers are produced by the drawing of especially prepared blanks or rods. These rods are built up of concentric layers having different properties required for the particular purpose. The optical transmission properties of light guide fibers are controlled by the internal layers, such as the core and the sheath. The latter are then surrounded by an envelope which improves the mechanical strength, especially the tensile strength, of the light guide fibers.

For the production of such rods for the drawing of light guide fibers, a rod having the desired properties can be produced either by the internal coating of an envelope tube, or by encasing a finished rod consisting of core and sheath in an envelope tube and welding the two together. Tubes of fused rock crystal or quartz sand or tubes of synthetic quartz glass (vitreous fused silica) are used in making the envelope tubes.

These known quartz glass envelope tubes made of fused rock crystal or quartz sand are prepared from materials of high purity. In spite of this, these envelope tubes still contain mineral impurities and bubbles which limit the tensile strength as well as the maximum producible fiber length, a disadvantage which is felt particularly in the production of light guide fibers for undersea cables.

It is known to produce envelope tubes also from synthetic quartz glass. These tubes make possible a greater fiber length and higher tensile strength in the light guide fibers. The production of these envelopes is very expensive, however, on account of the amount of labor involved and also on account of the high cost of the material.

THE INVENTION

It is the aim of the present invention to provide a quartz glass envelope tube for the production of rods to be used for the drawing of light guide fibers, which provides tensile strength and fiber length equal to those of an envelope tube of synthetic quartz glass, but is less expensive to manufacture.

This object is achieved by a quartz envelope tube for the preparation of rods for use in the drawing of light guide fibers by building up the quartz glass envelope tube from concentric layers such that the inner layer consists of fused rock crystal or of quartz sand, the outer layer of which is at least 0.2 mm thick and amounts to approximately 2 to 50% of the total wall thickness of a tube which has a maximum total wall thickness of 10 mm. Advantageously, the outer layer consists essentially of a coating deposited from a vapor.

Generally the thickness of the inner layer is between 1.2 mm and 8 mm, preferably 1.5 to 7 mm. The total tube wall thickness is generally at least 1 mm and preferably 2 to 9 mm. The external layer is generally at least 0.2 mm thick and generally up to 0.8 mm thick, preferably 0.5 to 1 mm.

The over-all diameter of the entire tube (including the hollow and the walls) is generally 10 to 50 mm, preferably 20 to 40 mm.

The advantages of the invention lie in the fact that, in the manufacture of light guide fiber using the envelope tube of the invention, even though quartz glass made from fused rock crystal or quartz sand is used, very long fiber lengths can be produced in comparison to the use of an envelope tube of quartz glass made solely from fused rock crystal or quartz sand. This is accomplished especially through the selected combination of the thickness of the two layers.

BRIEF DESCRIPTION OF THE DRAWING

An embodiment of the envelope tube of the invention is represented in cross section in the accompanying drawing.

DESCRIPTION OF SPECIFIC EMBODIMENT

The envelope 1 consists essentially of a quartz glass layer 3 made of quartz glass produced from fused rock crystal or quartz sand, and a layer 2 of the synthetic quartz glass.

The production of an envelope tube having a length, for example, of 1 m, an internal layer thickness of 1.5 mm, an external layer thickness of 0.5 mm and an outside diameter of 20 mm, is performed by applying a layer of synthetic quartz glass of 5 mm thickness to a supporting tube of quartz glass which consists of fused rock crystal or quartz sand and has a thickness of 1.5 mm, by converting a silicon halide, especially silicon tetrachloride, by chemical reaction in the vapor form to silicon dioxide, e.g., by flame hydrolysis or by means of inductively coupled plasma burners.

What is claimed is:

1. Quartz glass envelope tube for the production of a light guide fiber blank, in the form of a laminate, the internal layer consisting essentially of fused rock crystal or quartz sand and the external layer of synthetic quartz glass, the total tube wall thickness of said tube being not greater than 10 mm, the external layer being at least 0.2 mm thick and amounting to approximately 2 to 50% of the total tube wall thickness.

2. Quartz glass envelope tube of claim 1, wherein the outer layer consists essentially of a vapor phase deposit synthetic quartz glass.

3. Quartz glass envelope tube of claim 2, wherein said synthetic quartz glass is produced from reaction of a silicon halide by flame hydrolysis.

4. Quartz glass envelope tube of claim 2, wherein said synthetic quartz glass is produced from a silicon halide by means of an inductively coupled plasma burner.

5. A rod for the formation a light guide fiber consisting essentially of:
   (a) an internal quartz glass rod itself consisting essentially of
      (1) a core
      (2) a sheath disposed about said core; and
   (b) a quartz glass envelope tube disposed about said internal quartz glass rod itself consisting essentially of
      (1) an internal layer consisting essentially of fused rock crystal or quartz sand;
      (2) an external layer consisting essentially of synthetic quartz glass, a total tube wall thickness of said tube being not greater than 10 mm, the external layer being at least 0.2 mm thick and amounting to approximately 2 to 50% of the total wall thickness of said envelope tube.

6. A rod according to claim 2, wherein the outer layer of said quartz glass envelope tube consists essentially of a vapor phase deposited synthetic quartz glass.

7. A rod according to claim 6, wherein said synthetic quartz glass is produced from reaction of a silicon halide by flame hydrolysis.

8. A rod according to claim 6, wherein said synthetic quartz glass is produced from a silicon halide by means of an inductively coupled plasma burner.

9. A hollow quartz glass envelope tube consisting essentially of a hollow space about which is disposed said tube, said tube consisting essentially of:
   (1) an internal layer consisting essentially of fused rock crystal or quartz sands;
   (2) an external layer consisting essentially of synthetic quartz glass, the total wall thickness of said tube being not greater than 10 mm, the external layer being at least 0.2 mm thick and amounting to approximately 2 to 50% of the total wall thickness of said envelope tube.

10. A hollow tube according to claim 9, wherein said outer layer consists essentially of a vapor phased deposited synthetic quartz glass.

11. A hollow tube according to claim 10, wherein said synthetic quartz glass is produced from reaction of a silicon halide by flame hydrolysis.

12. A hollow tube according to claim 10, wherein said synthetic quartz glass is produced from a silicon halide by means of an inductively coupled plasma burner.

13. A rod for the formation of a light guide fiber comprising an envelope tube internally coated with quartz glass, said envelope tube consisting essentially of:
   (a) an internal layer consisting essentially of fused rock crystal or quartz sand, and
   (b) an external layer consisting essentially of synthetic quartz glass, a total tube wall thickness of said tube being not greater than 10 mm, the external layer being at least 0.2 mm thick and amounting to approximately 2 to 50% of the total wall thickness of said envelope tube.

* * * * *